United States Patent
Shimagami et al.

(10) Patent No.: US 8,005,338 B2
(45) Date of Patent: Aug. 23, 2011

(54) RECORDING AND REPRODUCING DEVICE

(75) Inventors: Kazuto Shimagami, Mito (JP); Atsuhiro Ono, Kitaura (JP)

(73) Assignee: Hitachi, Ltd., Tokyo (JP)

( * ) Notice: Subject to any disclaimer, the term of this patent is extended or adjusted under 35 U.S.C. 154(b) by 979 days.

(21) Appl. No.: 11/194,526

(22) Filed: Aug. 2, 2005

(65) Prior Publication Data

US 2006/0056816 A1   Mar. 16, 2006

(30) Foreign Application Priority Data

Sep. 14, 2004   (JP) ................. 2004-266168

(51) Int. Cl.
| | |
|---|---|
| H04N 5/932 | (2006.01) |
| H04N 5/935 | (2006.01) |
| H04N 5/931 | (2006.01) |
| H04N 3/14 | (2006.01) |
| H04N 5/335 | (2011.01) |
| H04N 7/12 | (2006.01) |
| H04N 11/02 | (2006.01) |
| H04N 11/04 | (2006.01) |

(52) U.S. Cl. ........ 386/201; 386/202; 386/203; 386/207; 386/208; 348/295; 348/423.1; 348/425.4

(58) Field of Classification Search ............... 386/1, 46, 386/52–55, 68, 95, 111–112, 83, 123–126, 386/201, 202, 203, 207, 208, 295, 423.1, 386/425.4

See application file for complete search history.

(56) References Cited

U.S. PATENT DOCUMENTS

| | | | |
|---|---|---|---|
| 5,563,661 A | | 10/1996 | Takahashi et al. |
| 5,973,748 A | * | 10/1999 | Horiguchi et al. ............ 348/554 |
| 2002/0006270 A1 | * | 1/2002 | Nitta et al. ...................... 386/95 |
| 2002/0140859 A1 | | 10/2002 | Kariatsumari |
| 2002/0146239 A1 | * | 10/2002 | Hamasaka et al. .............. 386/95 |
| 2002/0168174 A1 | * | 11/2002 | Ito ................................... 386/65 |
| 2004/0013198 A1 | * | 1/2004 | Togashi et al. ........... 375/240.12 |
| 2006/0072399 A1 | | 4/2006 | Fujimoto |

FOREIGN PATENT DOCUMENTS

| | | |
|---|---|---|
| CN | 1377185 A | 10/2002 |
| JP | 06-334961 | 12/1994 |
| JP | 7-177479 | 7/1995 |
| JP | 2002-204416 | 7/2002 |
| JP | 2004-159225 | 6/2004 |
| WO | WO 2004/077825 | 9/2004 |

* cited by examiner

Primary Examiner — Thai Tran
Assistant Examiner — Daquan Zhao
(74) Attorney, Agent, or Firm — Antonelli, Terry, Stout & Kraus, LLP.

(57) ABSTRACT

The following configuration is preferable for providing a digital broadcast-enabled recording and reproducing device involving no lip-sync error and offering good usability. For example, the recording and reproducing device includes a receiver that receives digital broadcast data, a video/audio signal generator that generates a video signal and an audio signal included in the digital broadcast data received by the receiver, an image processing unit that executes image processing of the video signal input from the video/audio signal generator; and a delay unit that receives the audio signal generated by the video/audio signal generator to adjust time lag between the received audio signal and the video signal processed by the image processing unit.

2 Claims, 2 Drawing Sheets

RECORDING AND REPRODUCING DEVICE

CLAIM OF PRIORITY

The present application claims priority from Japanese application serial no. JP 2004-266168, filed on Sep. 14, 2004, the content of which is hereby incorporated by reference into this application.

BACKGROUND OF THE INVENTION

The present invention relates to a recording and reproducing device that can receive digital broadcasting. In recent years, there have been proposed recording and reproducing devices that are combined devices having a digital tuner for receiving digital broadcasting, a hard disk drive (HDD) and a digital versatile disk drive (DVD). An example of the recording and reproducing devices is disclosed in Japanese Patent Laid-open No. 2004-159225. The recording and reproducing device of this patent document includes, as shown in FIG. 1, a digital tuner and two MPEG decoders. One of the decoders decodes MPEG-compressed transport streams (abbreviated as "TS" hereinafter) from an HDD (this decoder is referred to as "MPEG_TS decoder" hereinafter). The other decodes MPEG-compressed program streams (abbreviated as "PS" hereinafter) from a DVD (this decoder is referred to as "MPEG_PS decoder" hereinafter).

Video and audio signals decoded in the MPEG_TS and MPEG_PS decoders are output from respective output terminals of the device. In this outputting, in order to eliminate time lag of reproduction between the video and audio signals, i.e., in order to achieve lip-sync, a technique disclosed in Japanese Patent Laid-open No. 7-177479, for example, is used to correct the time lag between the video and audio signals, caused at each MPEG decoder.

SUMMARY OF THE INVENTION

The digital broadcasting encompasses both digital high vision broadcasting (HD broadcasting) and digital standard broadcasting (SD broadcasting). Therefore, a need arises to execute scaling processing for display of the HD broadcasting and conversion of the HD broadcasting into NTSC output for a VTR (VCR) and DVD recorder, i.e., down-conversion of high definition (HD) images into NTSC signals, which are standard definition (SD) images.

As such, for example when HD images are converted into SD images for recording, a scaling filter of the recording and reproducing device needs to have a function of up-converting the recorded SD images so that the HD images can be watched. Typically it takes much time to perform the scaling processing, which causes a problem in that video signals are delayed relative to the audio signals and thus lip-sync errors are caused. The above-described patent documents do not refer to such problem at all, and therefore disclose no solution therefor. Thus, in consideration of the above-described problem, the present invention intends to provide users with an easy-to-use recording and reproducing device.

An aspect of the invention has the following configuration in order to solve the above-described problem. For example, a recording and reproducing device includes a receiver that receives digital broadcast data, a video/audio signal generator that generates a video signal and an audio signal included in the digital broadcast data received by the receiver, an image processing unit that executes image processing of the video signal input from the video/audio signal generator, and a delay unit that receives the audio signal generated by the video/audio signal generator to adjust time lag between the received audio signal and the video signal processed by the image processing unit. This configuration allows provision of a digital broadcast-enabled recording and reproducing device offering users good usability.

DETAILED DESCRIPTION OF THE PREFERRED EMBODIMENT

Figure 1:
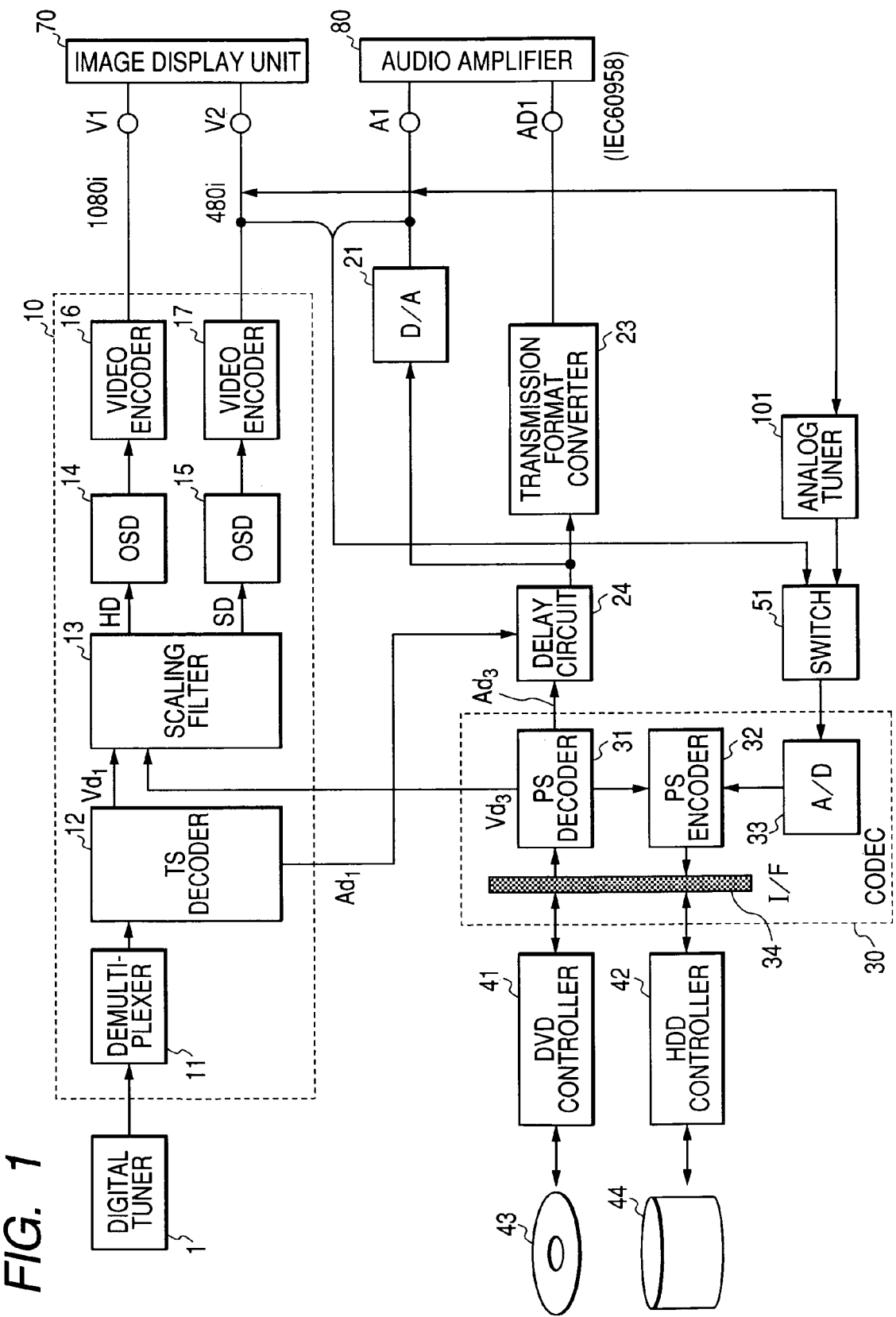
FIG. 1 is a schematic configuration diagram of a recording and reproducing device illustrating a first embodiment of the present invention.

Preferred embodiments of the present invention will be descried below in detail with reference to the drawings. In the drawings, the same parts are given the same numerals.

First Embodiment

FIG. 1 is a schematic diagram showing a first embodiment of the invention. A TS signal of an HD signal demodulated by a digital tuner 1 for receiving digital terrestrial broadcasting is input to a high-vision level (HL) decoder 10 that decodes the HD signal. The HL decoder 10 includes a demultiplexer 11, an MPEG_TS decoder 12, a scaling filter 13, OSD circuits 14 and 15, and video encoders 16 and 17 that will be described later.

An MPEG_PS CODEC 30 encodes (compresses) video/audio signals into MPEG_PS, and decodes MPEG_PS. The MPEG_PS CODEC 30 includes an A/D converter 33, an MPEG_PS encoder 32, an MPEG_PS decoder 31, and an IDE I/F 34. The recording and reproducing device also includes a delay circuit 24 and a transmission format converter 23 that converts digital audio signals into a transmission format of a digital interface defined by IEC60958.

The operation of this configuration will be described. First, reproduction of digital broadcasting will be described. A TS signal is input to the HL decoder 10. The demultiplexer 11 selects and separates from the TS signal a TS packet of a desired program (channel). Video and audio signals of the TS signal of the desired program are decoded by the MPEG_TS decoder 12, respectively. A digital video signal $Vd_1$ of an HD image output from the MPEG_TS decoder 12 is transmitted to the scaling filter 13. The scaling filter 13 subjects the digital video signal $Vd_1$ to down-conversion from an HD image to an SD image or up-conversion from an SD image to an HD image as well as image processing such as enlargement, reduction, or conversion into a desired aspect ratio.

An HD signal output from the scaling filter 13 is applied, via the OSD circuit 14 that adds character information to the signal for example, to the video encoder 16 for converting digital video signals into analog video signals. The HD signal is then converted into a 1080i HD video signal in the video encoder 16 so as to be output from a terminal V1.

Furthermore, an SD signal output from the scaling filter 13 is applied, via the OSD circuit 15 that adds character information to the signal for example, to the video encoder 17 for converting digital video signals into analog video signals. The SD signal is then converted into an NTSC signal that is a 480i SD video signal by the video encoder 17 so as to be output from a terminal V2. The signals output from the terminals V1 and V2 are input to an image display unit 70, and either one of the signals is selected and displayed on the image display unit 70. A device for selecting either one of the signals may be included in the image display unit 70.

The scaling filter 13 is also fed with a digital video signal $Vd_3$ of an SD image decoded and output by the MPEG_PS decoder 31. The scaling filter 13 up-converts the digital video signal $Vd_3$ to an HD signal, and executes predetermined scaling processing. The SD signal output from the scaling filter 13 passes through the OSD circuit 15 and the video encoder 17 sequentially, and is output from the terminal V2 as a 480i NTSC signal. The HD signal output from the scaling filter 13 passes through the OSD circuit 14 and the video encoder 16 sequentially, and is output from the terminal V1 as a 1080i HD video signal. The signals output from the terminals V1 and V2 are input to the image display unit 70 similar to the operation described previously, and either one of the signals is selected and displayed on the image display unit 70.

In contrast, a digital audio signal $Ad_1$ decoded and output by the MPEG_TS decoder 12 is input to the delay circuit 24, followed by being delayed by predetermined time. To the delay circuit 24, a digital audio signal is also input from the MPEG_PS decoder 31 of the MPEG_PS CODEC 30.

The delay circuit 24 delays and outputs the audio signal $Ad_1$ from the MPEG_TS decoder 12 by time corresponding to the delay time of the video signal relative to the audio signal at the scaling filter 13. This delay time is determined in advance in consideration of the processing time it takes for the scaling filter 13 to perform image processing. The determined time information is stored in a storage unit (not shown) for storing data. A CPU (not shown) refers to the time information to allow the audio signal $Ad_1$ to be outputted with delayed time.

The signal output from the delay circuit 24 is converted into an analog signal by a D/A converter 21 and then output from a terminal A1. The signal output from the delay circuit 24 is also input to the transmission format converter 23 so as to be converted into a transmission format of a digital interface defined by IEC60958. The resulting transmission format is then output from a terminal AD1 as an optical digital audio output. Either one of the signals output from the terminals A1 and AD1 is selected and output from an audio amplifier 80. A device for selecting either one of the signals may be included in the audio amplifier 80.

As described above, the present embodiment provides the delay circuit 24 for delaying the audio signal $Ad_1$ output from the MPEG_TS decoder 12. More specifically, the delay of the video signal relative to the audio signal, generated due to scaling processing in the scaling filter 13, is corrected not by the MPEG_PS decoder but by delaying the audio signal $Ad_1$ in the delay circuit 24, to thereby achieve lip-sync.

This configuration can eliminate lip-sync errors attributed to processing time in the scaling filter 13, and thus allows users to enjoy videos without feeling uncomfortable.

Description will be made on how to record broadcast signals received by the digital tuner 1 to an HDD 34 or a DVD 44. Here, how to record an SD image to the HDD 34 or the DVD 44 will be described.

Referring to FIG. 1, Coupled to the IDE I/F 34 are the DVD 43 and the HDD 44 via a DVD controller 41 for controlling reading and writing of the DVD 43 and via an HDD controller 42 for controlling the HDD 44, respectively. To the A/D converter 33, one of video/audio signals from an analog tuner 101 and video/audio signals from the terminals V2 and A1 is input after being selected by a switch 51.

A broadcast signal received by the digital tuner 1 is input to the HL decoder 10. The processing in the HL decoder 10 is the same as the above-described processing. A video signal output by the video encoder 17 and an audio signal output from the D/A converter 21 are input via the switch 51 to the MPEG_PS CODEC 30. The video and audio signals input to the MPEG_PS CODEC 30 are converted from analog signals to digital signals by the A/D converter 33 included in the MPEG_PS CODEC 30. Passing through the MPEG_PS encoder 32 and the IDE I/F 34 sequentially, the digital signals is recorded to the HDD 44 or the DVD 43 in a PS format.

The above-described processing is controlled by the CPU (not shown) based on recording instruction data input via an input part (not shown) of a remote controller or the like of a user. When information is recorded in the HDD 44 or the DVD 43, the HDD controller 42 or the DVD controller 41 controls the recording in regards to a recording format, recording rate and so forth. Here, the recording to the HDD 44 or the DVD 43 is controlled to be implemented in a PS format.

The above-described processing allows a user to record broadcast signals received by the digital tuner 1 to the HDD 34 or the DVD 44.

Description will be made on how to reproduce a program, film or the like recorded to the DVD 43 or the HDD 44.

In this case also, the above-described lip-sync correction unit (the delay circuit 24 of FIG. 1) is utilized. Specifically, program data recorded in the DVD 43 or the like is input via the DVD controller 42 and the IDE I/F 34 to the MPEG_PS decoder 31. Of the program data input to the MPEG_PS decoder 31, a video signal is output to the scaling filter 13 while an audio signal is output to the delay circuit 24.

Thus, even when a program or the like recorded in a DVD is reproduced, lip-sync errors due to processing time it takes for the scaling filter 13 to perform processing can be eliminated, permitting a user to enjoy video or audio without feeling uncomfortable. In addition, the delay circuit 24 can commonly be used to achieve lip-sync for all the cases of reproduction of a broadcast program, a program recorded in a storage medium, and so on, which contributes to reduction of the circuit scale.

It should be noted that the invention is not limited to the above-described example in which a program recorded to a DVD is reproduced. Any other configuration is available as long as a program or the like recorded in a storage medium that can record digital signals, such as an HDD or CD-ROM, is reproduced.

The following description is about the case of dubbing from the HDD 44 to the DVD 43, for example. In this case, signals do not pass through the scaling filter 13. If, as is conventional, the MPEG_PS decoder 31 is arranged to correct the delays of video signals, caused by the scaling filter 13, this delay correction by the MPEG_PS decoder 31 would cause lip-sync errors for dubbing from the HDD 44 to the DVD 43.

In contrast, the present embodiment has a configuration in which the MPEG_PS decoder 31 does not have a function of correcting delays caused by the scaling filter 13. In other words, for both the system of the HL decoder 10 (reproduction of broadcasting) and the system of the MPEG_PS CODEC 30 (reproduction from a storage medium), lip-sync is achieved by the common delay circuit 24 provided externally of the MPEG_PS decoder 31. If an instruction of dubbing, for example, of program information or the like recorded in the HDD 44 is issued, the program information or the like is read out from the HDD 44 by the HDD controller 42. The program information read from the HDD 44 is input via the IDE I/F 34 to the MPEG_PS decoder 31 and decoded thereat. Then, the program information thus decoded is encoded in the MPEG_PS encoder 32, after which the program information passes through the DVD controller 41, followed by subjecting to recording to the DVD 43.

Thus, the problem of lip-sync errors does not arise also in the case of dubbing from the HDD 44 to the DVD 43. As a result, users can view and hear images constructed of video/audio signals subjected to dubbing from the HDD 44 to the DVD 43 without feeling uncomfortable, achieving good usability.

Although the above-described example has illustrated the case of dubbing from the HDD 44 to the DVD 43, the above-described configuration can provide similar advantages also for dubbing from the DVD 43 to the HDD 44.

Furthermore, the invention is not limited to the above-described example in which the data recorded in the HDD 44 is program information including both video and audio. For example, the data recorded in the HDD 44 may be data including only audio or video, such as music by a singer or a silent film.

In addition, in the above-described example, the delay circuit 24 offers lip-sync for both the system of the HL decoder 10 (reproduction of broadcasting) and the system of the MPEG_PS CODEC 30 (reproduction from a storage medium). In contrast to this, for example, in the system of the HL decoder 10 (reproduction of broadcasting), lip-sync errors due to the scaling filter 13 may be corrected with the MPEG_TS decoder 12 without transmitting audio signals to the delay circuit 24. Such a configuration can also eliminate lip-sync errors in dubbing from the HDD 44 to the DVD 43 as well as lip-sync errors by the scaling filter 13 in reproduction with the system of the MPEG_PS CODEC 30 (reproduction from a storage medium), allowing users to view and hear video and audio without feeling uncomfortable.

Second Embodiment

Figure 2:
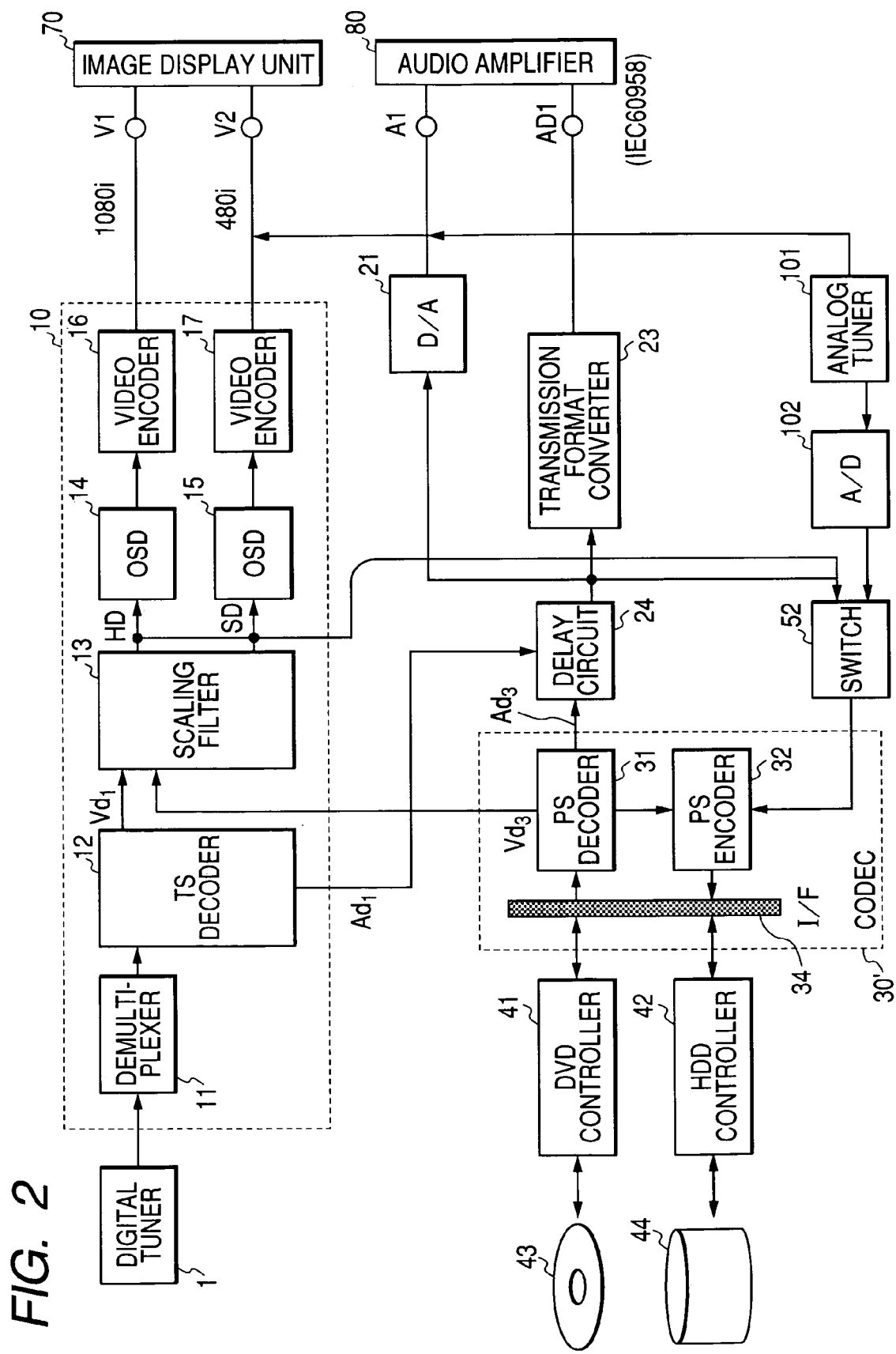
FIG. 2 is a schematic configuration diagram of a recording and reproducing device illustrating a second embodiment of the present invention.

A second embodiment of the invention will be described. FIG. 2 is a configuration diagram of a recording and reproducing device illustrating the second embodiment. The second embodiment is different from the first embodiment in that digital video/audio signals are directly recorded as they are without conversion into analog signals. Other features are the same as those in the first embodiment.

Specifically, a video signal from the scaling filter 13 and an audio signal from the delay circuit 24 are input directly as digital signals, via the switch 52 to the MPEG_PS CODEC 30. The switch 52 also receives an output from the analog tuner 101, converted from an analog signal to a digital signal by the A/D converter 102. The output from the analog tuner is recorded in the DVD 43 or the HDD 44. This configuration eliminates the need to provide the A/D converter 33 of FIG. 1, contributing to high-speed processing and reduction of the circuit scale.

According to the above-described configuration, users can view and hear images constructed of the recorded digital video/audio signals without feeling uncomfortable, achieving good usability.

It should be noted that the invention is not limited to the above-described embodiments, but the disclosed principles and novel characteristics encompass a wide technical scope. For example, the above-described configuration block diagrams, flow charts, display screen examples and so forth are just only examples for specifically illustrating the embodiments, and are not restricted by the disclosed scope.

What is claimed is:

1. A recording and reproducing device comprising:
   a first video/audio signal generator that generates a video signal and an audio signal by decoding a TS format data;
   a second video/audio signal generator that generates a video signal and an audio signal by decoding a PS format data;
   an image processing unit that executes image processing of the video signal input from the first video/audio signal generator and the second video/audio signal generator; and
   a delay unit that receives the audio signal generated by the first video/audio signal generator and the second video/audio signal generator and the delay unit that is used commonly by the first video/audio signal generator and the second video/audio signal generator to adjust time lag between the received audio signal and the video signal processed by the image processing unit.

2. The recording and reproducing device according to claim 1, further comprising:
   a receiver that receives a TS format digital broadcast; and
   a recording unit that records a PS format data;
   wherein the first video/audio signal generator generates the video signal and the audio signal by decoding the TS format data separated from the TS format digital broadcast received by the receiver; and
   wherein the second video/audio signal generator generates the video signal and the audio signal by decoding the PS format data recorded by the recording unit.

* * * * *